(12) United States Patent
Washburn (10) Patent No.: US 6,782,656 B2
(45) Date of Patent: Aug. 31, 2004

(54) PLANTING SYSTEM

(76) Inventor: Phyllis R. Washburn, 1440 Doggett Rd., Forest City, NC (US) 28043

( * ) Notice: Subject to any disclaimer, the term of this patent is extended or adjusted under 35 U.S.C. 154(b) by 0 days.

(21) Appl. No.: 10/178,865

(22) Filed: Jun. 24, 2002

(65) Prior Publication Data

US 2003/0005865 A1 Jan. 9, 2003

Related U.S. Application Data

(60) Provisional application No. 60/301,467, filed on Jun. 27, 2001.

(51) Int. Cl.[7] .......................... A01G 13/04; A01G 23/02
(52) U.S. Cl. ............................... 47/29; 47/74
(58) Field of Search ............................. 47/73, 74, 76, 47/77, 901, 29, 28.1, 26, 30; 111/114, 100, 101, 102, 104, 105, 115–117, 89, 99, 700, 900, 916, 915

(56) References Cited

U.S. PATENT DOCUMENTS

| | | | | |
|---|---|---|---|---|
| 3,112,577 A | * | 12/1963 | Burger | 47/74 |
| 3,962,822 A | * | 6/1976 | Walters | 47/74 |
| 4,168,962 A | * | 9/1979 | Lambeth | 71/31 |
| 4,299,054 A | * | 11/1981 | Ware | 47/64 |
| 4,333,265 A | * | 6/1982 | Arnold | 47/74 |
| 5,651,214 A | * | 7/1997 | Zucker et al. | 47/74 |
| 6,161,331 A | | 12/2000 | Lalane | |
| 6,516,565 B1 | * | 2/2003 | Fima | 47/74 |

FOREIGN PATENT DOCUMENTS

DE             4244399 A1 * 7/1994 .............. A01G/9/02

* cited by examiner

Primary Examiner—Christopher J. Novosad
(74) Attorney, Agent, or Firm—Edmond S. Miksch

(57) ABSTRACT

A planting module for planting a seed or a bulb in the earth includes the seed or bulb disposed in a dissoluble capsule so that after the module has been placed in the earth and water is supplied, the capsule disintegrates and the seed or bulb sprouts.

17 Claims, 8 Drawing Sheets

PLANTING SYSTEM

CROSS-REFERENCE TO RELATED APPLICATIONS

Priority is claimed from Provisional Patent Application having serial No. 60/301,467 filed on Jun. 27, 2001, and entitled The Instant Gardener Bag. The teachings of that application are hereby incorporated into the present application by reference thereto.

FIELD OF THE INVENTION

The present invention relates, in general, to apparatus and methods for planting seeds and bulbs, and for facilitating early growth thereof.

BACKGROUND OF THE INVENTION

The planting of seeds and bulbs for growing flowers or vegetables is a notoriously laborious process, and requires specific knowledge of the optimum planting parameters for the specific seeds or bulbs being planted. Generally, each type of seed or bulb has a preferred depth at which it should be planted, and for maximum production of flowers or vegetables, there is an optimum separation for the seeds or bulbs.

Traditional planting methods generally involve preparing the existing soil by spading and tilling to form a loose soil and eliminate weeds. Seeds or bulbs are, then placed in the soil and may be watered to accelerate growth. The seeds or bulbs therefore begin sprouting in soil which may have a poor chemical profile, and thus their growth may be retarded. Also, the process of spading and tilling the earth generally does not eliminate all weed material, and weeds soon begin to grow. Unless the gardener has specific knowledge concerning the seeds or bulbs being planted, they may not be placed at the optimum depth or at the optimum separation from one another. Furthermore, the labor of planting includes the step of adding fertilizer of the correct type and concentration for the seeds or bulbs being planted A number of patents address the need to facilitate the planting process of seeds by providing mats containing seeds. After the ground is tilled, the mats are placed on the ground and watered to encourage growth. For example, U.S. Pat. No. 6,389,745 teaches a layered system including viscous cellulose fiber sheets containing seeds. Additional layers provide protection.

In these layered systems, generally the seeds are not at an optimum separation, and they are disposed in fibrous material, not in good potting soil. Also, once the seeds sprout and begin to grow, they may crowd each other, and retard each other's growth.

SUMMARY OF THE INVENTION

In one aspect, the present invention is a planting arrangement that includes a dissoluble container with potting soil disposed in the dissoluble container, the potting soil having a generally level surface. One or more planting modules which are spaced apart from one another are placed in the soil, each of the planting modules including one or more seeds or bulbs disposed in a dissoluble capsule. The planting arrangement may be placed in earth with its generally level surface at approximately the level of the surrounding earth.

In another aspect, the present invention is a planting module which includes a dissoluble capsule containing at least one seed or at least one bulb.

In an additional aspect, the present invention is a method of planting seeds or bulbs. The method includes placing the seeds or the bulbs in dissoluble capsules, the dissoluble capsules having at least one mark or structural feature which indicates a preferred planting depth for the seeds or the bulbs. The method also includes placing the capsules in earth in accordance with the mark(s) or structural feature(s) whereby the seeds or the bulbs are at the preferred planting depth. The method further includes watering the capsules so that the capsules disintegrate and the seeds or the bulbs contact moistened earth to germinate and begin growth.

OBJECTS OF THE INVENTION

It is therefore one of the primary objects of the present invention to facilitate the process of growing flowers and vegetables.

It is also an object of the present invention to provide a planting system for seeds and bulbs for use by persons who are not skilled gardeners.

An additional object of the present invention is to enable planting seeds and bulbs without extensive soil cultivation.

Another object of the present invention is to provide a planting system for seeds and bulbs wherein growth begins in good potting soil.

Still another object of the present invention is to provide a planting system for seeds and bulbs wherein growth begins in soil that is free of weeds.

Yet another object of the present invention is to provide a planting system for seeds and bulbs that places the seeds or bulbs at an optimum depth.

A further object of the present invention is to provide a planting system for seeds and bulbs that places the seeds or bulbs at an optimum separation from each other.

It is an additional object of the present invention to provide a planting arrangement having at least one embodiment wherein a ventilated transparent cover protects the newly sprouted plants from cold and thus enables planting earlier in the season.

Still yet another object of the present invention is to provide a complete planting arrangement wherein seeds or bulbs are disposed in good potting soil at an optimum depth and an optimum separation from one another.

Yet still another object of the present invention is to provide seeds or bulbs in dissoluble capsules.

A still further object of the present invention is to provide seeds or bulbs in capsules that disintegrate when water is supplied.

An additional object of the present invention is to provide economical dissoluble capsules for seeds and bulbs.

Yet another object of the present invention is to provide planting capsules which disintegrate without introducing harmful products into the soil.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

CALL OUT LIST OR DRAWING ELEMENTS

10 Planting arrangement
12 Dissoluble Container
13 Perimeter of dissoluble container
14 Potting soil
15 Time release nutrient granules
16 Ventilated transparent cover for planting arrangement
17 Surface of potting soil
18 Ventilation port in ventilated transparent cover
20 Planting arrangement having elongate container
22 Elongate dissoluble container
30 Planting module
31 Dissoluble capsule
32 Dissoluble lid
33 Top of dissoluble capsule
34 Structural elements
35 Seed
36 Preferred planting depth for seed
37 Preferred separation
38 Bulb
39 Preferred planting depth for bulb
40 Ambient earth
42 Surface of ambient earth
50 Planting module including paper or cardboard sheath
52 Dissoluble capsule
54 Paper or cardboard sheath
56 Mark on planting module indicating preferred planting depth
60 Planting arrangement having ventilated transparent cover

BRIEF DESCRIPTION OF THE PRESENTLY PREFERRED AND VARIOUS ALTERNATIVE EMBODIMENTS OF THE INVENTION

Figure 1:
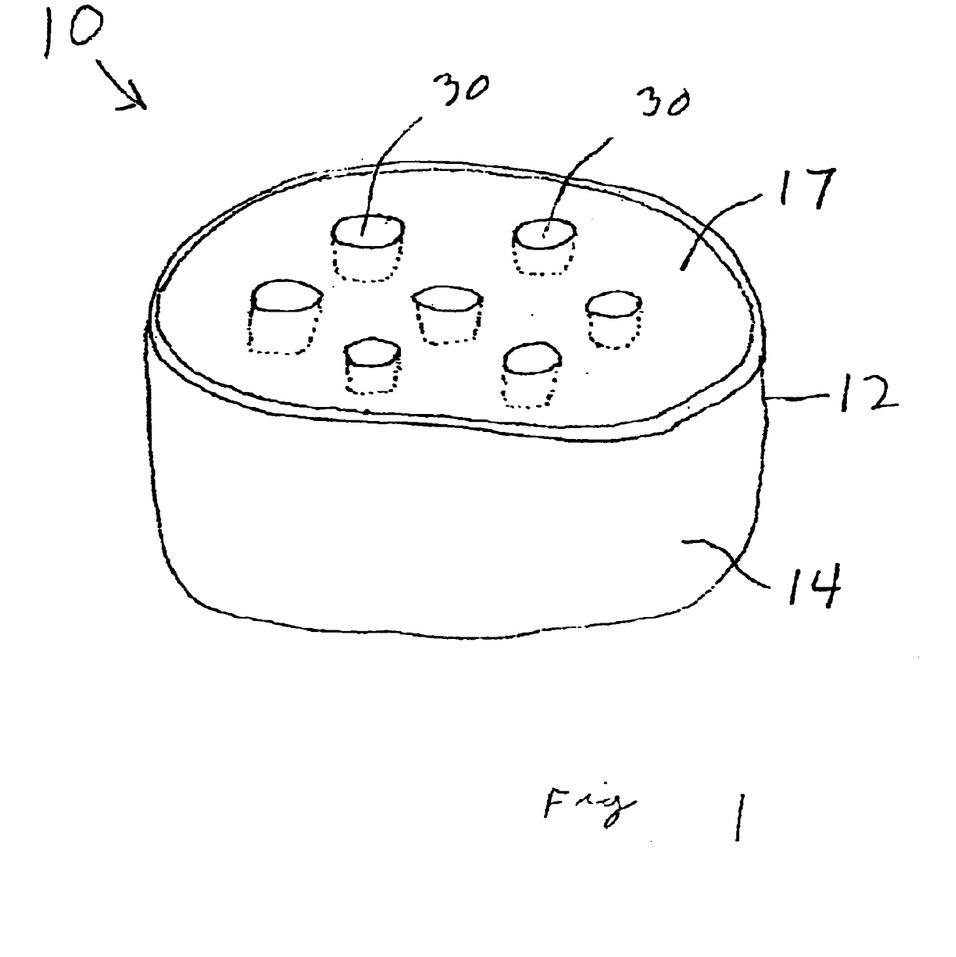
FIG. 1 is a perspective illustration of a planting arrangement having a plurality of planting modules disposed in potting soil and contained within a dissoluble container.

Attention is directed to FIG. 1 which illustrates a planting arrangement, generally designated 10, according to the present invention. Planting arrangement 10 includes a dissoluble container 12, potting soil 14 disposed in dissoluble container 12, and a plurality of planting modules, generally designated 30 disposed in potting soil 14. Potting soil 14 has a generally level surface 17. Planting modules 30 contain seeds or bulbs and are better shown in FIGS. 6–11. The term potting soil, as employed in this application, refers to soil which has a good organic component fur supporting plant growth, and which contains no weeds. It is sometimes referred to as "gardening soil". The term "dissoluble" as employed in this application, refers to a material that looses its physical integrity when exposed to water. The preferred material for this application is starch. A person skilled in the art will recognize that most "packing peanuts" made to protect shipped goods from breakage are made of starch. In the presently preferred embodiment, dissoluble container 12 is comprised of starch. In order to prevent dissolution or loss of strength of the dissoluble container 12, the moisture content of the potting soil 14 should be not more than about 5% to 7%.

Figure 2:
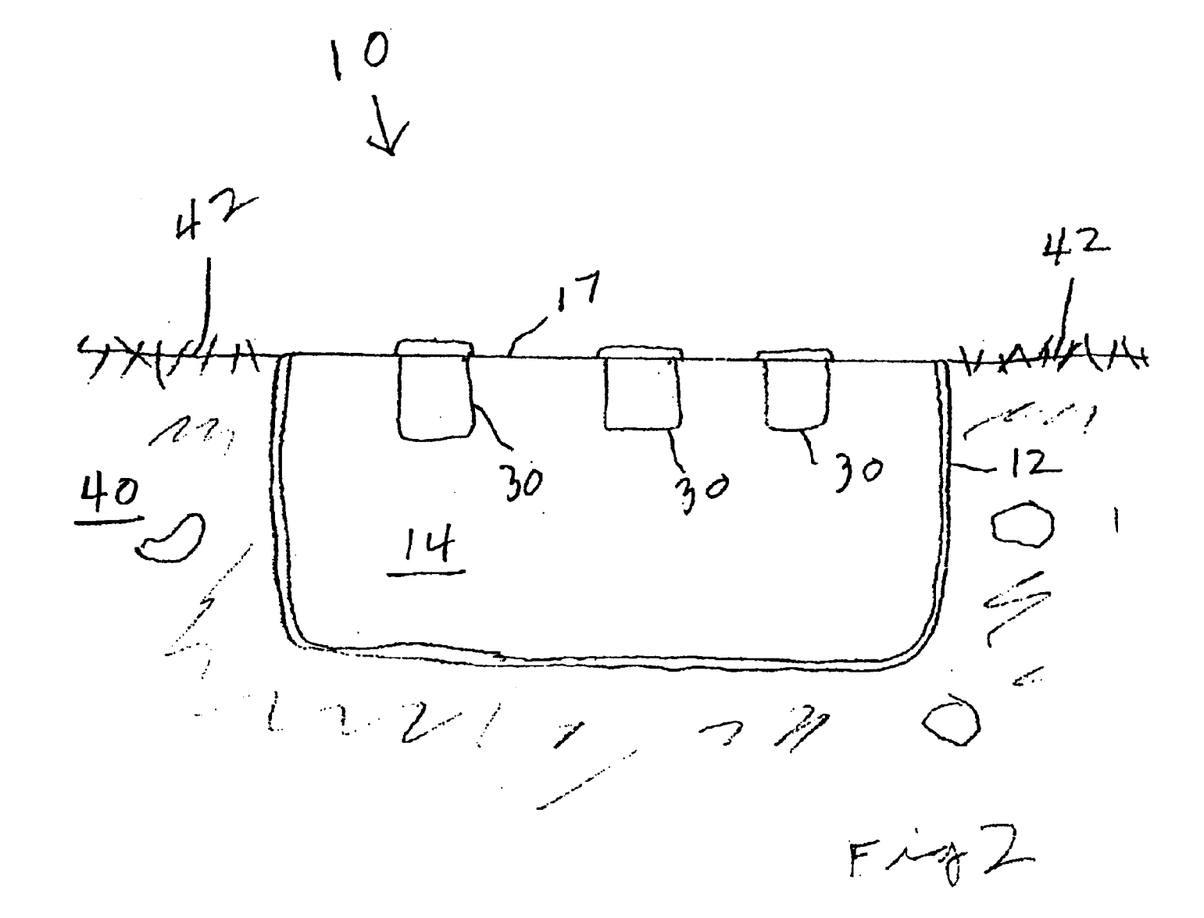
FIG. 2 is a perspective illustration of the planting arrangement of FIG. 1 placed in the ground.

FIG. 2 illustrates the planting arrangement 10 disposed in the ambient earth 40. The ambient earth 40 is presumed to not necessarily be good gardening soil. The planting arrangement 10 is placed in ambient earth 40 so the surface 17 of potting soil 14 is approximately at the level of surface 42 of ambient earth 40. When water is added, dissoluble container 12 looses its structural integrity. As discussed subsequently, planting modules 30 include seeds or bulbs which sprout and begin growing into potting soil 14.

Figure 3:
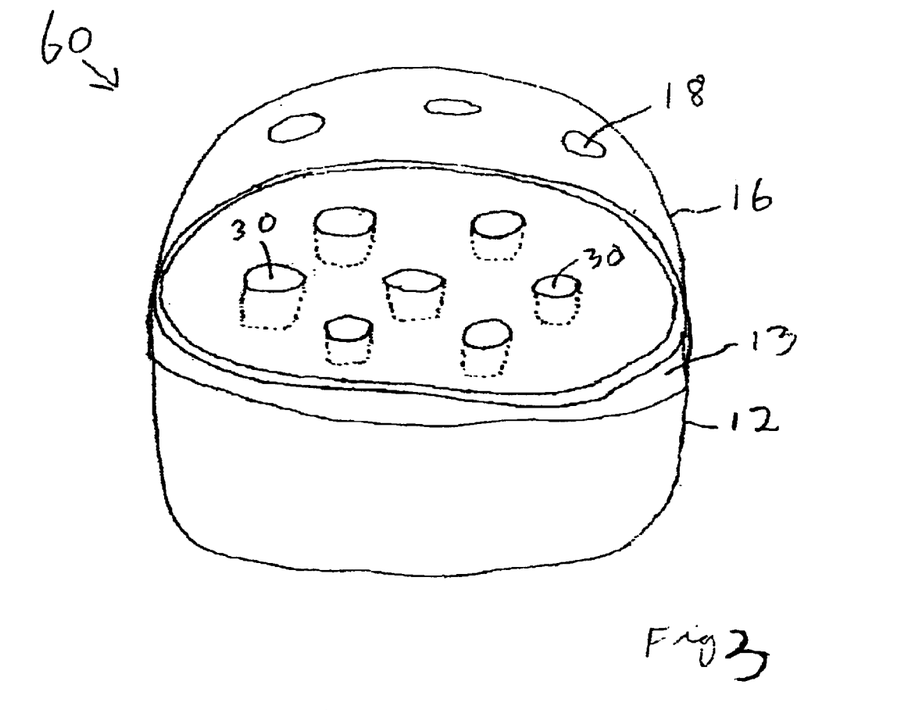
FIG. 3 is a perspective illustration of the planting arrangement of FIG. 1 further including a ventilated transparent cover for thermal protection.

FIG. 3 illustrates a planting arrangement, generally designated 60, that is similar to planting arrangement 10, except that it further includes a ventilated transparent cover 16 having ventilation ports 18. Ventilated transparent cover 16 is attached, preferably by gluing, to the perimeter 13 of dissoluble container 12. Ventilated transparent cover 16 is to facilitate planting early in the growing season.

Figure 4:
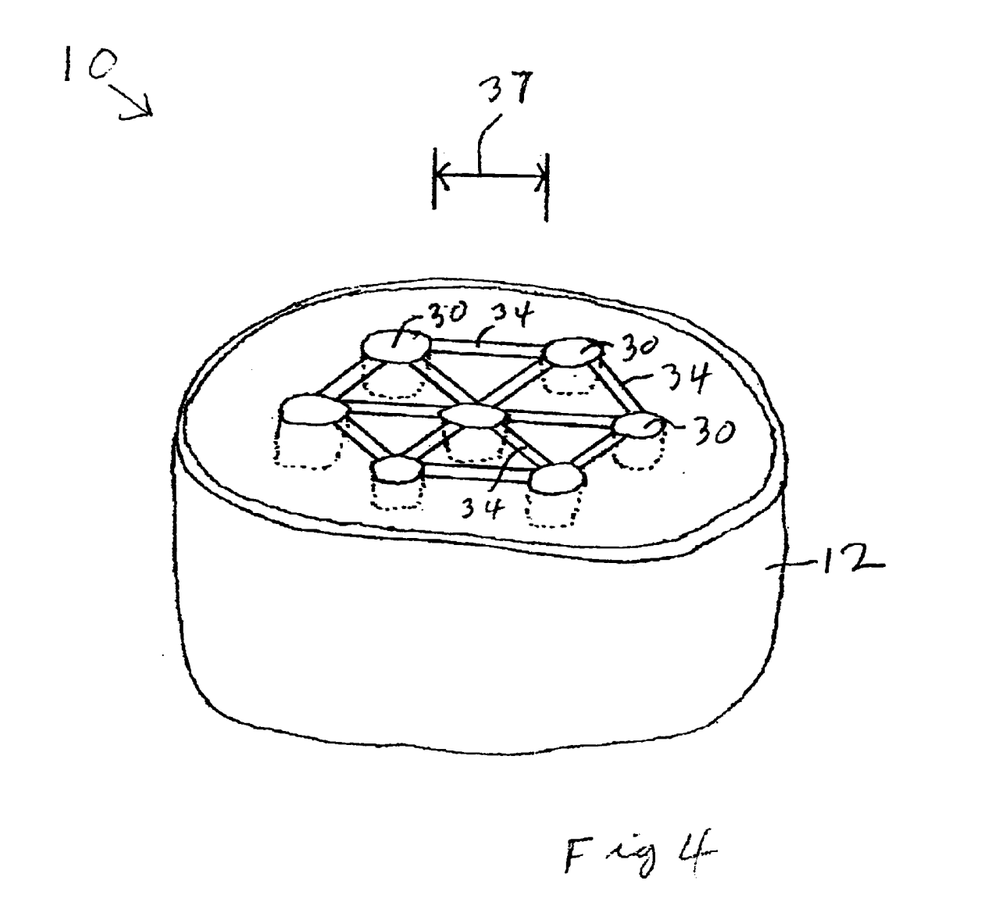
FIG. 4 is a perspective illustration of the planting arrangement of FIG. 1 further including rods connecting the planting modules to place them at a preferred separation.

FIG. 4 shows a planting arrangement 10 in which planting modules 30 are spaced at a preferred separation 37 by structural elements 34. It is presently preferred that structural elements 34 be rods. Preferably, they should also be made of a dissoluble material.

Figure 5:
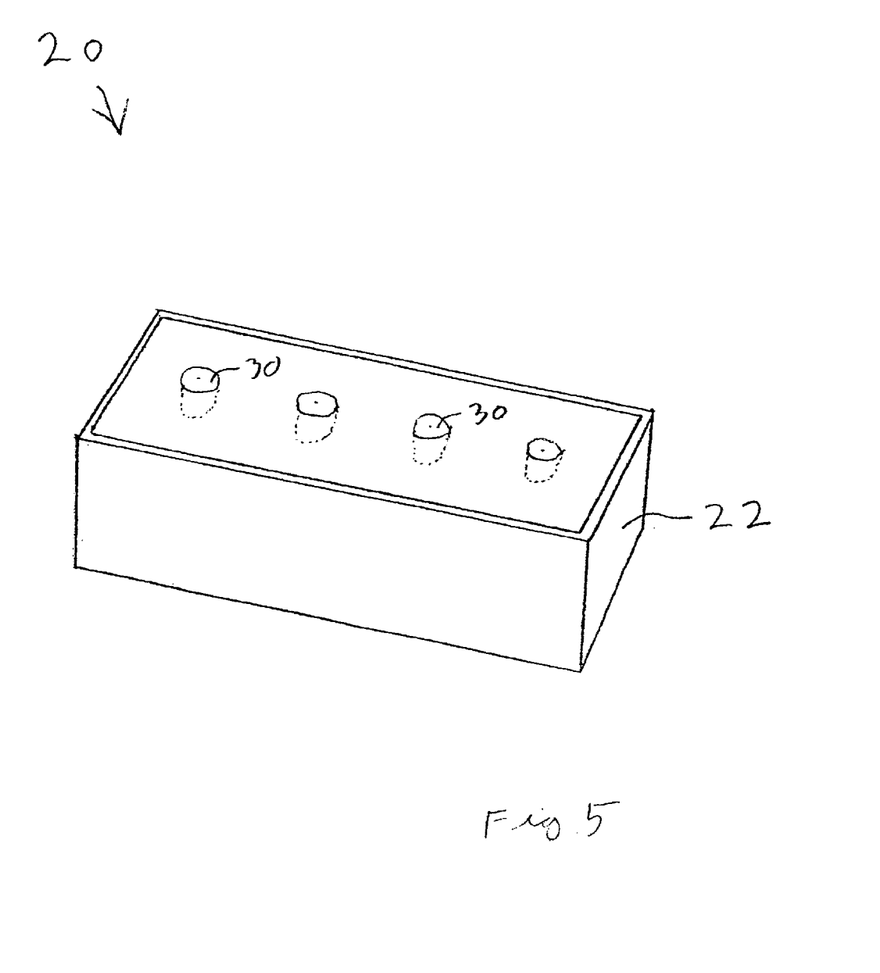
FIG. 5 is a perspective of a planting arrangement having a plurality of planting modules disposed in potting soil and contained within a dissoluble, elongate container.

FIG. 5 illustrates an embodiment in which a planting arrangement, generally designated 20, has an elongate dissoluble container 22. This arrangement is preferred for planting in rows. Elongate, dissoluble container 22 may have a rectangular form. The planting modules 30 are, preferably, disposed in a row.

Figures 6, 7:
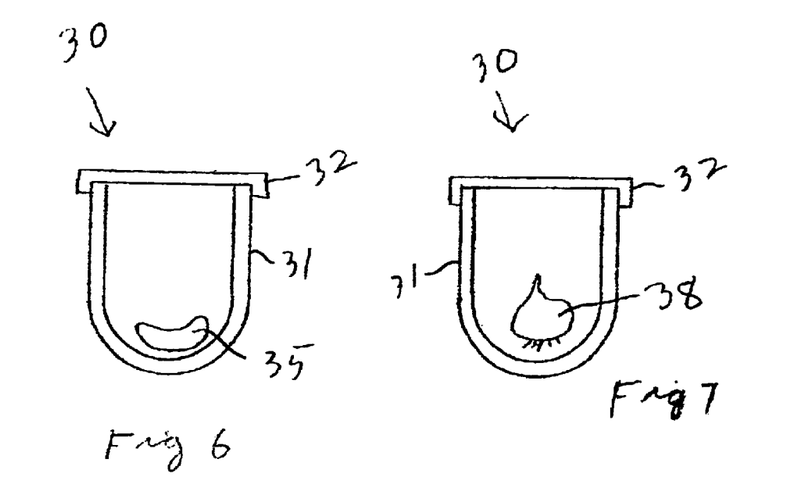
FIG. 6 is a vertical section of a planting module having a seed disposed within a dissoluble capsule.
FIG. 7 is a vertical section of a planting module having a bulb disposed within a dissoluble capsule.

FIG. 6 is a planting module 30 according to the present invention. A seed 35 is placed in a dissoluble capsule 31 having a dissoluble lid 32. FIG. 7 illustrates a planting module 30 having a bulb 38 disposed in dissoluble capsule 31 having a dissoluble lid 32.

Figure 8:
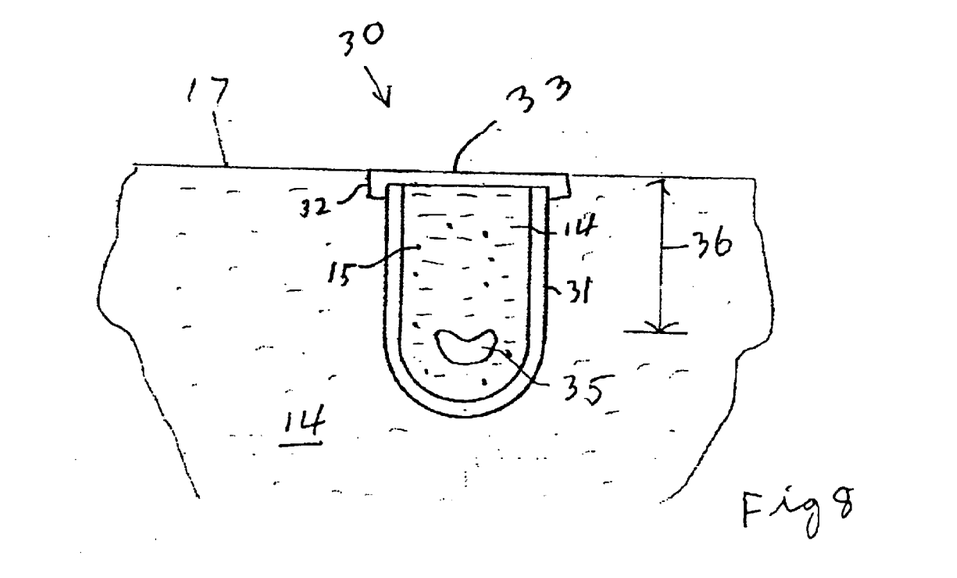
FIG. 8 is a vertical section of a planting module having a seed and potting soil disposed within a dissoluble capsule.
Figure 9:
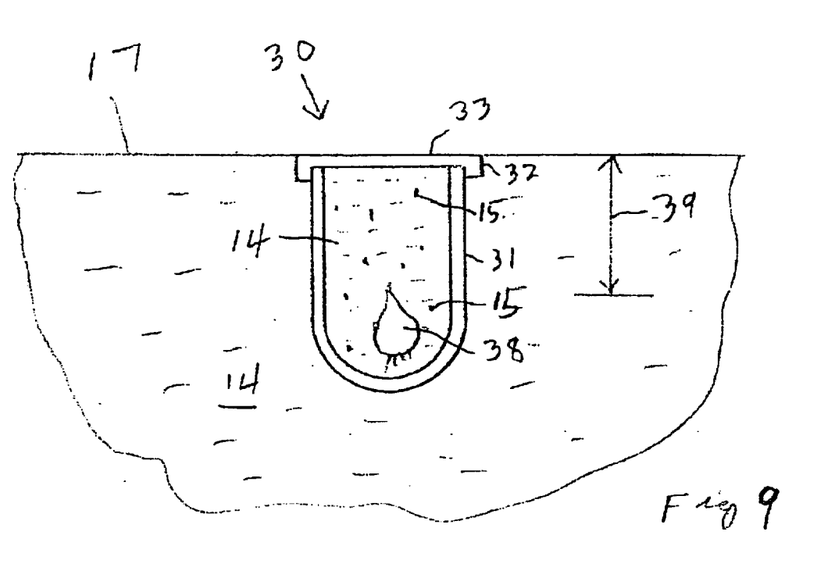
FIG. 9 is a vertical section of a planting module having a bulb and potting soil disposed within a dissoluble capsule.

FIGS. 8 and 9 show the planting module 30 disposed in potting soil 14, planting module 30 further including potting soil 14 disposed within planting module 30. FIG. 8 also shows some of the potting soil 14 disposed above seed 35, covering seed 35, and FIG. 9 shows some of the potting soil 14 disposed above bulb 38, covering bulb 38. FIGS. 8 and 9 also illustrate time release nutrient granules 15 disposed in potting soil 14 in planting module 30. The dissoluble lid 32 acts as a structural feature indicating a preferred orientation for placing the module in the potting soil 14. Furthermore the dissoluble lid 32 acts as a structural feature, indicating the preferred planting depth. As shown in FIG. 8, if the top 33 of the dissoluble capsule 31 is at the level of surface 17 of potting soil 14, the seed 35 will be at the preferred planting depth 36. Likewise, as shown in FIG. 9, if the top 33 of dissoluble capsule 31 is at the level of surface 17 of potting soil 14, the bulb 38 will be at the preferred planting depth 39. It is presently preferred that dissoluble capsule 31 and its dissoluble lid 32 be comprised of starch. To preserve the structural integrity of the starch, the moisture content of potting soil 14 should be no more than about 5% to 7%.

Planting module 30 may be included in planting arrangements 10, 20, or 60. Alternatively, it may be employed as a planting aid of its own. Used independently, it would be placed independently in potting soil 14. It may, for example, be employed for planting in a second year, following first planting of a planting arrangement 10, 20, or 60.

Figure 10:
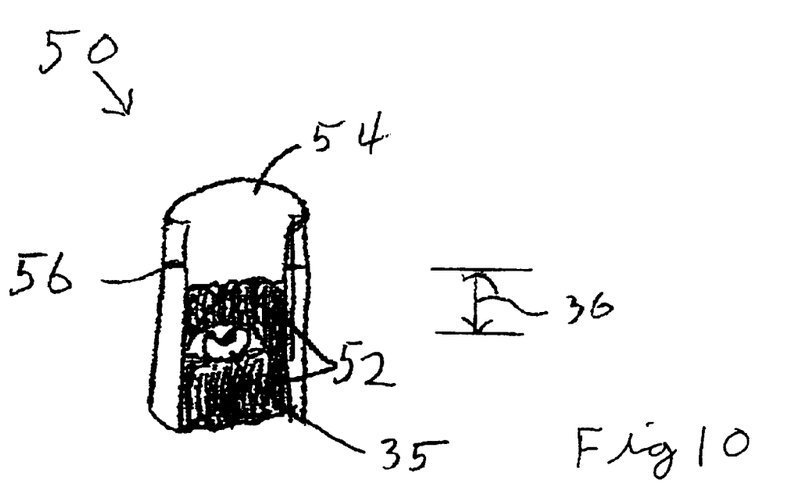
FIG. 10 is a view of a planting module having a seed disposed in a dissoluble capsule and a paper or cardboard sheath, surrounding the capsule.

An alternative planting module, generally designated 50, is illustrated in FIG. 10. A portion has been cut away to reveal seed 35 disposed in dissoluble capsule 52. A paper or cardboard sheath 54 surrounds dissoluble capsule 52. Planting module 50 is particularly intended for employment in planting arrangements 10, 20, or 60. The purpose of the paper or cardboard sheath 54 is to protect the dissoluble capsule 52 from moisture in potting soil 14. To ensure planting at the preferred depth 36, one or more marks 56 are placed on paper or cardboard sheath 54 to indicate the preferred level of the surface 17 of potting soil 14.

Figure 11:
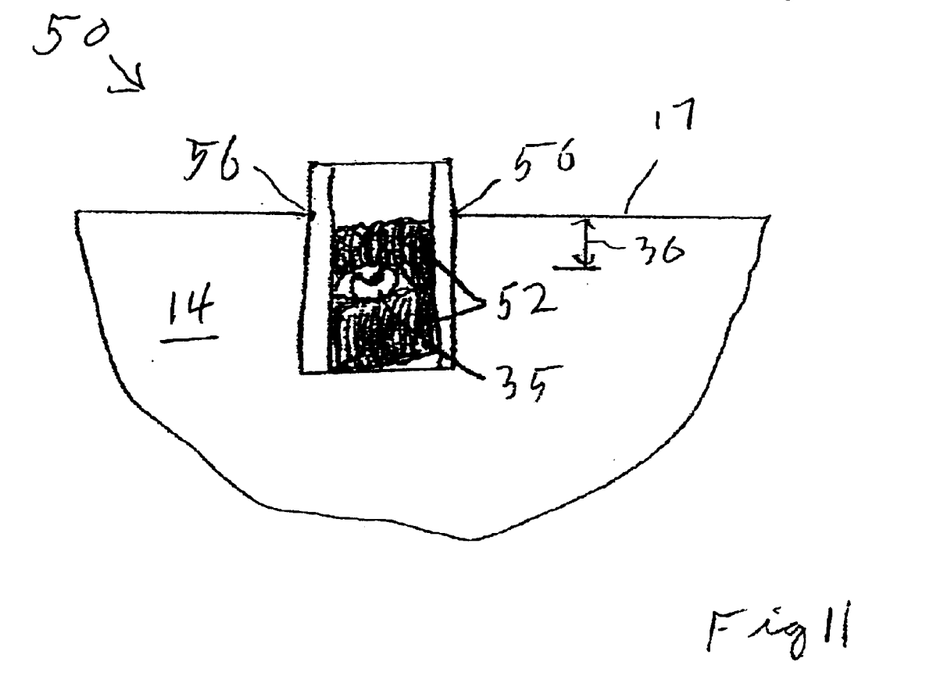
FIG. 11 is an illustration of the planting module of FIG. 10 placed in potting soil at a preferred depth for the seed.

FIG. 11 shows planting module 50 planted in potting soil 14 with mark(s) 56 at the level of surface 17 of potting soil 14 so that seed 35 is disposed at the preferred planting depth 36.

While the invention, with various embodiments, has been described above, in accordance with the patent statutes, a person skilled in the art will recognize that many modifications and variations are possible within the spirit and scope of the invention, as defined in the following claims.

I claim:

1. A planting arrangement comprising:
    a dissoluble container;
    potting soil disposed in said dissoluble container, said potting soil having a generally level surface;
    a plurality of spaced apart planting modules disposed in said potting soil, each of said planting modules including at least one seed or at least one bulb in a dissoluble capsule;
    at least one dissoluble rod attached to at least two of said spaced apart planting modules, said at least one dissoluble rod placing said at least two of said spaced apart planting modules at a preferred separation for planting, and
    said planting arrangement placeable in earth with said generally level surface of said potting soil at substantially a level of a surface of said earth.

2. A planting arrangement, according to claim 1, wherein said dissoluble container is elongate.

3. A planting arrangement, according to claim 1, further including a ventilated transparent cover attached to said dissoluble container, said ventilated transparent cover to facilitate early planting.

4. A planting arrangement, according to claim 1, wherein said dissoluble container is comprised of starch.

5. A planting arrangement, according to claim 1, wherein at least one of said dissoluble capsules is comprised of starch.

6. A planting arrangement, according to claim 1, further comprising potting soil disposed in said dissoluble capsules.

7. A planting arrangement, according to claim 6, wherein said potting soil disposed in said dissoluble capsules includes nutrient granules to enhance growth of said seed(s) or said bulb(s).

8. A planting arrangement, according to claim 7, wherein said nutrient granules comprise time release nutrient granules.

9. A planting arrangement, according to claim 1, further comprising potting soil disposed in at least one of said dissoluble capsules, a portion of said potting soil in said dissoluble capsule(s) being disposed above said seed(s) or said bulb(s) to cover said seed(s) or said bulb(s) whereby said seed(s) or said bulb(s) are at a preferred depth for planting.

10. A planting arrangement comprising:
    a dissoluble container;
    potting soil disposed in said dissoluble container, said potting soil having a generally level surface;
    a plurality of spaced apart planting modules disposed in said potting soil, each of said planting modules including at least one seed or at least one bulb in a dissoluble capsule;
    potting soil disposed in at least one of said dissoluble capsules, a portion of said potting soil in said dissoluble capsule(s) being disposed above said seed(s) or said bulb(s) to cover said seed(s) or said bulb(s) whereby said seed(s) or said bulb(s) are at a preferred depth for planting;
    wherein at least one of said dissoluble capsules is positioned with its top at a level of said generally level surface of said potting soil disposed in said dissoluble container; and
    said planting arrangement placeable in earth with said generally level surface of said potting soil in said dissoluble container at substantially a level of a surface of said earth.

11. A planting arrangement, according to claim 10, wherein said dissoluble container is elongate.

12. A planting arrangement, according to claim 11, wherein said dissoluble container has a rectangular form.

13. A planting arrangement, according to claim 12, wherein said dissoluble capsules are disposed in a row.

14. A planting arrangement, according to claim 10, wherein said potting soil in said dissoluble capsules includes nutrient granules to enhance growth of said seed(s) or said bulb(s).

15. A planting arrangement, according to claim 14, wherein said nutrient granules comprise time release nutrient granules.

16. A planting arrangement, according to claim 10, further including a ventilated transparent cover attached to said dissoluble container, said ventilated transparent cover to facilitate early planting.

17. A planting arrangement comprising:
    a dissoluble container;
    potting soil disposed in said dissoluble container, said potting soil having a generally level surface;
    a plurality of spaced apart planting modules disposed in said potting soil, each of said planting modules including at least one seed or at least one bulb in a dissoluble capsule;
    at least one dissoluble rod attached to at least two of said spaced apart planting modules, said at least one dissoluble rod placing said at least two of said spaced apart planting modules at a preferred separation for planting;
    potting soil disposed in at least one of said dissoluble capsules, a portion of said potting soil in said dissoluble capsule(s) being disposed above said seed(s) or said bulb(s) to cover said seed(s) or said bulb(s) whereby said seed(s) or said bulb(s) are at a preferred depth for planting;
    at least one of said dissoluble capsules being positioned with its top at a level of said generally level surface of said potting soil in said dissoluble container; and
    said planting arrangement placeable in earth with said generally level surface of said potting soil at substantially a level of a surface of said earth.

* * * * *